US008582957B2

(12) United States Patent
Taxier et al.

(10) Patent No.: US 8,582,957 B2
(45) Date of Patent: Nov. 12, 2013

(54) METHODS AND APPARATUS FOR VISUALLY DISPLAYING RECORDING TIMER INFORMATION

(75) Inventors: Karen Michelle Taxier, Highlands Ranch, CO (US); Matthew Coburn, Denver, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 1192 days.

(21) Appl. No.: 12/235,464

(22) Filed: Sep. 22, 2008

(65) Prior Publication Data

US 2010/0074592 A1 Mar. 25, 2010

(51) Int. Cl.
*H04N 5/76* (2006.01)

(52) U.S. Cl.
USPC .......... 386/291; 725/48; 725/54; 725/55; 725/56; 725/57

(58) Field of Classification Search
USPC .......... 386/223, 248, 29, 1; 725/46, 55–61
See application file for complete search history.

(56) References Cited

U.S. PATENT DOCUMENTS

| | | |
|---|---|---|
| 4,450,477 A | 5/1984 | Lovett |
| 4,725,888 A | 2/1988 | Hakamada |
| 4,739,510 A | 4/1988 | Jeffers et al. |
| 4,799,056 A | 1/1989 | Hattori et al. |
| 4,852,019 A | 7/1989 | Vinberg et al. |
| 4,868,785 A | 9/1989 | Jordan et al. |
| 5,021,974 A | 6/1991 | Pisculli et al. |
| 5,187,776 A | 2/1993 | Yanker |
| 5,260,778 A | 11/1993 | Kauffman et al. |
| 5,428,734 A | 6/1995 | Haynes et al. |
| 5,438,372 A | 8/1995 | Tsumori et al. |
| 5,450,536 A | 9/1995 | Rosenberg et al. |
| 5,453,796 A | 9/1995 | Duffield et al. |
| 5,539,478 A | 7/1996 | Bertram et al. |
| 5,539,479 A | 7/1996 | Bertram |
| 5,545,857 A | 8/1996 | Lee et al. |
| 5,548,340 A | 8/1996 | Bertram |

(Continued)

FOREIGN PATENT DOCUMENTS

| | | |
|---|---|---|
| EP | 1063797 A2 | 12/2000 |
| EP | 1158793 A2 | 11/2001 |

(Continued)

OTHER PUBLICATIONS

USPTO "Non-Final Office Action" mailed Dec. 21, 2010; U.S. Appl. No. 12/235,476, filed Sep. 22, 2008.

(Continued)

*Primary Examiner* — Kambiz Zand
*Assistant Examiner* — Ali Shayanfar
(74) *Attorney, Agent, or Firm* — Ingrassia Fisher & Lorenz, P.C.

(57) ABSTRACT

The various embodiments described herein generally provide apparatus, systems and methods which facilitate the display of television recording information to. More particularly, television recording information is presented visually to a user in a recording information menu. The visual recording information menu includes a time axis, and recording timers associated with particular television programs are presented as visual representations along the time axis. In the case that multiple television receiving resources are available, a resource axis may separately present recording timers associated with each of the disparate television receiving resources.

26 Claims, 11 Drawing Sheets

(56) References Cited

U.S. PATENT DOCUMENTS

| | | |
|---|---|---|
| 5,559,961 A | 9/1996 | Blonder |
| 5,585,866 A | 12/1996 | Miller et al. |
| 5,589,893 A | 12/1996 | Gaughan et al. |
| 5,594,469 A | 1/1997 | Freeman et al. |
| 5,594,509 A | 1/1997 | Florin et al. |
| 5,602,597 A | 2/1997 | Bertram |
| 5,604,544 A | 2/1997 | Bertram |
| 5,606,374 A | 2/1997 | Bertram |
| 5,650,827 A | 7/1997 | Tsumori et al. |
| 5,652,630 A | 7/1997 | Bertram et al. |
| 5,659,369 A | 8/1997 | Imaiida |
| 5,677,708 A | 10/1997 | Matthews, III et al. |
| 5,682,489 A | 10/1997 | Harrow et al. |
| 5,721,815 A | 2/1998 | Ottesen et al. |
| 5,721,878 A | 2/1998 | Ottesen et al. |
| 5,742,286 A | 4/1998 | Kung et al. |
| 5,751,883 A | 5/1998 | Ottesen et al. |
| 5,754,258 A | 5/1998 | Hanaya et al. |
| 5,767,840 A | 6/1998 | Selker |
| 5,768,158 A | 6/1998 | Adler et al. |
| 5,774,186 A | 6/1998 | Brodsky et al. |
| 5,786,805 A | 7/1998 | Barry |
| 5,801,747 A | 9/1998 | Bedard |
| 5,805,235 A | 9/1998 | Bedard |
| 5,809,265 A | 9/1998 | Blair et al. |
| 5,815,216 A | 9/1998 | Suh |
| 5,825,361 A | 10/1998 | Rubin et al. |
| 5,831,591 A | 11/1998 | Suh |
| 5,831,607 A | 11/1998 | Brooks |
| 5,867,162 A | 2/1999 | O'Leary et al. |
| 5,874,953 A | 2/1999 | Webster et al. |
| 5,898,431 A | 4/1999 | Webster et al. |
| 5,905,496 A | 5/1999 | Lau et al. |
| 5,917,489 A | 6/1999 | Thurlow et al. |
| 5,978,043 A | 11/1999 | Blonstein et al. |
| 5,999,228 A | 12/1999 | Matsuura et al. |
| 6,005,565 A | 12/1999 | Legall et al. |
| 6,008,735 A | 12/1999 | Chiloyan et al. |
| 6,008,860 A | 12/1999 | Patton et al. |
| 6,020,930 A | 2/2000 | Legrand |
| 6,064,376 A | 5/2000 | Berezowski et al. |
| 6,118,498 A | 9/2000 | Reitmeier |
| 6,125,374 A | 9/2000 | Terry et al. |
| 6,141,003 A | 10/2000 | Chor et al. |
| 6,147,714 A | 11/2000 | Terasawa et al. |
| 6,173,112 B1 | 1/2001 | Gruse et al. |
| 6,191,773 B1 | 2/2001 | Maruno et al. |
| 6,208,341 B1 | 3/2001 | van Ee et al. |
| 6,208,804 B1 | 3/2001 | Ottesen et al. |
| 6,215,417 B1 | 4/2001 | Krass et al. |
| 6,233,389 B1 | 5/2001 | Barton et al. |
| 6,266,098 B1 | 7/2001 | Cove et al. |
| 6,281,940 B1 | 8/2001 | Sciammarella |
| 6,334,217 B1 | 12/2001 | Kim |
| 6,493,036 B1 | 12/2002 | Fernandez |
| 6,498,628 B2 | 12/2002 | Iwamura |
| 6,526,577 B1 | 2/2003 | Knudson et al. |
| 6,529,685 B2 | 3/2003 | Ottesen et al. |
| 6,556,252 B1 | 4/2003 | Kim |
| 6,650,248 B1 | 11/2003 | O'Donnell et al. |
| 6,678,009 B2 | 1/2004 | Kahn |
| 6,697,123 B2 | 2/2004 | Janevski et al. |
| 6,750,803 B2 | 6/2004 | Yates et al. |
| 6,750,887 B1 | 6/2004 | Kellerman et al. |
| 6,774,914 B1 | 8/2004 | Benayoun |
| 6,804,824 B1 | 10/2004 | Potrebic et al. |
| 6,816,442 B1 | 11/2004 | Heiman et al. |
| 6,822,698 B2 | 11/2004 | Clapper |
| 6,882,712 B1 | 4/2005 | Iggulden et al. |
| 6,934,963 B1 | 8/2005 | Reynolds et al. |
| 6,943,845 B2 | 9/2005 | Mizutome et al. |
| 7,046,161 B2 | 5/2006 | Hayes |
| 7,061,544 B1 | 6/2006 | Nonomura et al. |
| 7,148,909 B2 | 12/2006 | Yui et al. |
| 7,171,622 B2 | 1/2007 | Bhogal |
| 7,196,733 B2 | 3/2007 | Aratani et al. |
| 7,206,029 B2 | 4/2007 | Cohen-Solal |
| 7,225,456 B2 | 5/2007 | Kitsukawa et al. |
| 7,231,603 B2 | 6/2007 | Matsumoto |
| 7,268,830 B2 | 9/2007 | Lee |
| 7,370,284 B2 | 5/2008 | Andrea et al. |
| 7,420,620 B2 | 9/2008 | Habas et al. |
| 7,434,246 B2 | 10/2008 | Florence |
| 7,440,036 B2 | 10/2008 | Onomatsu et al. |
| 7,584,492 B2 | 9/2009 | Terakado et al. |
| 7,600,201 B2 | 10/2009 | Endler et al. |
| 7,620,966 B2 | 11/2009 | Kitamori |
| 7,636,131 B2 | 12/2009 | Hsieh et al. |
| 7,707,599 B1 | 4/2010 | Groff et al. |
| 7,743,398 B2 * | 6/2010 | DeYonker et al. ............... 725/58 |
| 7,746,332 B2 | 6/2010 | Le Leannec et al. |
| 7,876,382 B2 | 1/2011 | Imaizumi |
| 7,880,813 B2 | 2/2011 | Nakamura et al. |
| 8,001,566 B2 | 8/2011 | Jang |
| 8,005,826 B1 | 8/2011 | Sahami et al. |
| 8,239,784 B2 | 8/2012 | Hotelling et al. |
| 2001/0011953 A1 | 8/2001 | Shintani et al. |
| 2001/0017672 A1 | 8/2001 | Verhaeghe |
| 2002/0054062 A1 | 5/2002 | Gerba et al. |
| 2002/0057382 A1 | 5/2002 | Yui |
| 2002/0059599 A1 | 5/2002 | Schein et al. |
| 2002/0060754 A1 | 5/2002 | Takeuchi |
| 2002/0070957 A1 | 6/2002 | Trajkovic et al. |
| 2002/0075333 A1 | 6/2002 | Dutta et al. |
| 2002/0075407 A1 | 6/2002 | Cohen-Solal |
| 2002/0097229 A1 | 7/2002 | Rose et al. |
| 2002/0122027 A1 | 9/2002 | Kim |
| 2002/0122079 A1 | 9/2002 | Kamen et al. |
| 2002/0129366 A1 | 9/2002 | Schein et al. |
| 2002/0174430 A1 | 11/2002 | Ellis et al. |
| 2002/0178446 A1 | 11/2002 | Sie et al. |
| 2002/0191954 A1 | 12/2002 | Beach et al. |
| 2003/0001908 A1 | 1/2003 | Cohen-solal |
| 2003/0005443 A1 | 1/2003 | Axelsson et al. |
| 2003/0005445 A1 | 1/2003 | Schein et al. |
| 2003/0018973 A1 | 1/2003 | Thompson |
| 2003/0025716 A1 | 2/2003 | Colavin |
| 2003/0066079 A1 | 4/2003 | Suga |
| 2003/0086694 A1 * | 5/2003 | Davidsson ............... 386/83 |
| 2003/0115589 A1 | 6/2003 | D'Souza et al. |
| 2003/0126607 A1 | 7/2003 | Phillips et al. |
| 2003/0131356 A1 | 7/2003 | Proehl et al. |
| 2003/0191947 A1 | 10/2003 | Stubblefield et al. |
| 2003/0193426 A1 | 10/2003 | Vidal |
| 2003/0208751 A1 | 11/2003 | Kim et al. |
| 2004/0041723 A1 | 3/2004 | Shibamiya et al. |
| 2004/0070593 A1 | 4/2004 | Neely et al. |
| 2004/0107439 A1 | 6/2004 | Hassell et al. |
| 2004/0111744 A1 | 6/2004 | Bae et al. |
| 2004/0168191 A1 | 8/2004 | Jerding et al. |
| 2004/0172651 A1 | 9/2004 | Wasilewski et al. |
| 2004/0201780 A1 | 10/2004 | Kim |
| 2004/0218905 A1 | 11/2004 | Green et al. |
| 2004/0230843 A1 | 11/2004 | Jansen |
| 2004/0250280 A1 | 12/2004 | Allport |
| 2004/0255336 A1 | 12/2004 | Logan et al. |
| 2005/0002649 A1 | 1/2005 | Boyle et al. |
| 2005/0010949 A1 | 1/2005 | Ward et al. |
| 2005/0015803 A1 | 1/2005 | Macrae et al. |
| 2005/0076361 A1 | 4/2005 | Choi et al. |
| 2005/0084233 A1 | 4/2005 | Fujii et al. |
| 2005/0128366 A1 | 6/2005 | Cha |
| 2005/0188402 A1 | 8/2005 | de Andrade et al. |
| 2005/0190280 A1 | 9/2005 | Haas et al. |
| 2005/0251826 A1 * | 11/2005 | Orr ............... 725/46 |
| 2005/0268100 A1 | 12/2005 | Gasparini et al. |
| 2006/0037047 A1 | 2/2006 | DeYonker et al. |
| 2006/0051058 A1 * | 3/2006 | Rudolph et al. ............... 386/83 |
| 2006/0061668 A1 | 3/2006 | Ise |
| 2006/0061688 A1 | 3/2006 | Choi |
| 2006/0064700 A1 | 3/2006 | Ludvig et al. |
| 2006/0084409 A1 | 4/2006 | Ghadiali |
| 2006/0095401 A1 | 5/2006 | Krikorian et al. |
| 2006/0236342 A1 | 10/2006 | Kunkel et al. |

(56) References Cited

U.S. PATENT DOCUMENTS

| | | |
|---|---|---|
| 2007/0019111 A1 | 1/2007 | Won |
| 2007/0039019 A1 | 2/2007 | Collier |
| 2007/0039020 A1 | 2/2007 | Cansler, Jr. et al. |
| 2007/0039021 A1 | 2/2007 | Lee |
| 2007/0061724 A1 | 3/2007 | Slothouber et al. |
| 2007/0074254 A1 | 3/2007 | Sloo |
| 2007/0079334 A1 | 4/2007 | Silver |
| 2007/0115391 A1 | 5/2007 | Anderson |
| 2007/0130607 A1 | 6/2007 | Thissen et al. |
| 2007/0186231 A1 | 8/2007 | Haeuser et al. |
| 2007/0192791 A1 | 8/2007 | Sullivan et al. |
| 2007/0195197 A1 | 8/2007 | Seong et al. |
| 2007/0199022 A1* | 8/2007 | Moshiri et al. ............ 725/39 |
| 2007/0266397 A1 | 11/2007 | Lin |
| 2007/0277198 A1 | 11/2007 | Yasukawa et al. |
| 2007/0277224 A1 | 11/2007 | Osborn et al. |
| 2008/0010518 A1 | 1/2008 | Jiang et al. |
| 2008/0024682 A1 | 1/2008 | Chen |
| 2008/0034314 A1 | 2/2008 | Louch et al. |
| 2008/0052245 A1 | 2/2008 | Love |
| 2008/0066102 A1 | 3/2008 | Abraham et al. |
| 2008/0074550 A1 | 3/2008 | Park |
| 2008/0088495 A1 | 4/2008 | Kawakita |
| 2008/0129886 A1 | 6/2008 | Ishihara |
| 2008/0147803 A1 | 6/2008 | Krzyzanowski et al. |
| 2008/0184324 A1 | 7/2008 | Yun et al. |
| 2008/0205847 A1 | 8/2008 | Yanagita et al. |
| 2008/0222523 A1 | 9/2008 | Fox et al. |
| 2008/0229254 A1 | 9/2008 | Warner |
| 2008/0231762 A1 | 9/2008 | Hardacker et al. |
| 2008/0235735 A1 | 9/2008 | Wroblewski |
| 2008/0263595 A1 | 10/2008 | Sumiyoshi et al. |
| 2009/0007209 A1 | 1/2009 | Kawai |
| 2009/0031335 A1 | 1/2009 | Hendricks et al. |
| 2009/0031343 A1 | 1/2009 | Sharkey |
| 2009/0070815 A1 | 3/2009 | Barrett et al. |
| 2009/0141024 A1 | 6/2009 | Lee et al. |
| 2009/0241145 A1* | 9/2009 | Sharma ............ 725/43 |
| 2010/0037180 A1 | 2/2010 | Elias et al. |
| 2010/0050199 A1 | 2/2010 | Kennedy |
| 2010/0071004 A1 | 3/2010 | Wightman |
| 2010/0077432 A1 | 3/2010 | VanDuyn et al. |
| 2010/0079671 A1 | 4/2010 | VanDuyn et al. |
| 2010/0079681 A1 | 4/2010 | Coburn et al. |
| 2010/0083309 A1 | 4/2010 | White et al. |
| 2010/0083310 A1 | 4/2010 | VanDuyn et al. |
| 2010/0083312 A1 | 4/2010 | White et al. |
| 2010/0083313 A1 | 4/2010 | White et al. |
| 2010/0083315 A1 | 4/2010 | White et al. |
| 2010/0083319 A1 | 4/2010 | Martch et al. |
| 2010/0100909 A1 | 4/2010 | Arsenault et al. |
| 2010/0115550 A1 | 5/2010 | Minnick et al. |
| 2010/0118211 A1 | 5/2010 | Carlsgaard et al. |
| 2010/0169958 A1 | 7/2010 | Werner et al. |
| 2010/0231525 A1 | 9/2010 | Chen |
| 2011/0018817 A1 | 1/2011 | Kryze et al. |

FOREIGN PATENT DOCUMENTS

| | | |
|---|---|---|
| TW | 200729167 | 1/2007 |
| WO | 0001142 A1 | 1/2000 |
| WO | 0145395 A | 6/2001 |
| WO | 0178054 A1 | 10/2001 |
| WO | 0178383 A2 | 10/2001 |
| WO | 02087243 A | 10/2002 |
| WO | 03043320 A2 | 5/2003 |
| WO | 2006119269 A2 | 11/2006 |
| WO | 20060127211 A2 | 11/2006 |
| WO | 2007015047 A2 | 2/2007 |
| WO | 2008013350 A2 | 1/2008 |

OTHER PUBLICATIONS

USPTO "Non-Final Office Action" mailed Mar. 31, 2011; U.S. Appl. No. 12/241,556, filed Sep. 30, 2008.
USPTO "Non-Final Office Action" mailed Jul. 6, 2011; U.S. Appl. No. 12/241,571, filed Sep. 30, 2008.
USPTO "Non-Final Office Action" mailed Jul. 12, 2011; U.S. Appl. No. 12/241,604, filed Sep. 30, 2008.
USPTO "Final Office Action" mailed Jun. 23, 2011; U.S. Appl. No. 12/241,580, filed Sep. 30, 2008.
USPTO "Final Office Action" mailed May 13, 2011; U.S. Appl. No. 12/235,476, filed Sep. 22, 2008.
USPTO "Non-Final Office Action" mailed Nov. 24, 2010; U.S. Appl. No. 12/242,587, filed Sep. 30, 2008.
USPTO "Non-Final Office Action" mailed Jan. 12, 2011; U.S. Appl. No. 12/241,580, filed Sep. 30, 2008.
USPTO "Non-Final Office Action" mailed Jan. 28, 2011; U.S. Appl. No. 12/236,430, filed Sep. 23, 2008.
USPTO "Non-Final office Action" mailed Feb. 4, 2011; U.S. Appl. No. 12/241,599, filed Sep. 30, 2008.
USPTO "Non-Final Office Action" mailed Feb. 9, 2011; U.S. Appl. No. 12/241,608, filed Sep. 30, 2008.
The International Bureau of WIPO "International Preliminary Report on Patentability" mailed Apr. 14, 2011; International Appln. No. PCT/US2009/058236, filed Sep. 24, 2009.
USPTO "Final Office Action" mailed May 13, 2011; U.S. Appl. No. 12/242,587, filed Sep. 30, 2008.
European Patent Office, International Searching Authority, "International Search Report" mailed Nov. 10, 2009; International Appln. No. PCT/EP2009/061499.
USPTO "Non-Final Office Action" mailed Jan. 31, 2011; U.S. Appl. No. 12/233,274, filed Sep. 18, 2008.
USPTO "Non-Final Office Action" mailed Dec. 6, 2011; U.S. Appl. No. 12/241,580, filed Sep. 30, 2008.
USPTO "Final Office Action" mailed Dec. 7, 2011; U.S. Appl. No. 12/241,599, filed Sep. 30, 2008.
USPTO "Final Office Action" mailed Oct. 21, 2011; U.S. Appl. No. 12/241,571, filed Sep. 30, 2008.
USPTO "Final Office Action" mailed Oct. 5, 2011; U.S. Appl. No. 12/241,556, filed Sep. 30, 2008.
USPTO "Non-Final Office Action" mailed Nov. 23, 2011; U.S. Appl. No. 12/242,614, filed Sep. 30, 2008.
USPTO "Final Office Action" mailed Jul. 28, 2011; U.S. Appl. No. 12/241,608, filed Sep. 30, 2008.
USPTO "Final Office Action" mailed Aug. 18, 2011; U.S. Appl. No. 12/233,274, filed Sep. 18, 2008.
International Searching Authority, European Patent Office, "International Search Report," mailed Feb. 4, 2010; International Application No. PCT/US2009/058937, filed Sep. 30, 2009.
International Searching Authority, Euopean Patent Office, "International Search Report," mailed Feb. 16, 2010; International Application No. PCT/US2009/057582, filed Sep. 18, 2009.
Wightman, Robert Edward "Methods and Apparatus for Providing Multiple Channel Recall on a Television Receiver," U.S. Appl. No. 12/233,274, filed Sep. 18, 2008.
USPTO "Final Office Action" mailed Jan. 20, 2012; U.S. Appl. No. 12/241,604, filed Sep. 30, 2008.
United States Patent and Trademark Office, Final Office Action for U.S. Appl. No. 12/241,599, dated Aug. 26, 2011.
International Searching Authority, European Patent Office, "International Search Report," mailed Dec. 7, 2009; International Application No. PCT/US2009/058457, filed Sep. 25, 2009.
International Searching Authority, European Patent Office, "International Search Report and Written Opinion," mailed Dec. 18, 2009; International Application No. PCT/US2009/058456, filed Sep. 25, 2009.
International Searching Authority, European Patent Office, "International Search Report and Written Opinion," mailed Dec. 21, 2009; International Application No. PCT/US2009/058454 filed Sep. 25, 2009.
Anonymous "ZigBee," Wikipedia, the Free Encyclopedia [online], Sep. 26, 2008, XP002558439; retrieved from the Internet: <URL:http://en.wikipedia.org/w/index.php?title=ZigBee &oldid=241085798> [retrieved on Dec. 2, 2009].
Nintendo, "Wii Operations Manual System Setup," 2007.

(56) References Cited

OTHER PUBLICATIONS

Wikipedia, the free encyclopedia, "Dashboard (Software," Retrieved from the Internet on Oct. 6, 2008, http://en.wikipedia.org/w/index.php?title=Dashboard_(software)&printable=yes.

International Searching Authority, European Patent Office, "International Search Report," mailed Jan. 20, 2010; International Application No. PCT/US2009/057825 filed Sep. 22, 2009.

Minnick, Danny Jean et al., "Graphical Interface Navigation Based on Image Element Proximity," U.S. Appl. No. 12/609,860, filed Oct. 30, 2009.

White, James Matthew et al. "Systems and Methods for Configuration of a Remote Control Device," U.S. Appl. No. 12/241,550, filed Sep. 30, 2008.

White, James Matthew et al. "Systems and Methods for Graphical control of User Interface Features Provided by a Television Receiver," U.S. Appl. No. 12/241,556, filed Sep. 30, 2008.

VanDuyn, Luke et al. "Systems and Methods for Graphical Control of Picture-In-Picture Windows," U.S. Appl. No. 12/241,571, filed Sep. 30, 2008.

White, James Matthew et al. "Systems and Methods for Providing Customer Service Features Via a Graphical User Interface in a Television Receiver," U.S. Appl. No. 12/241,580, filed Sep. 30, 2008.

Martch, Henry Gregg "Systems and Methods for Automatic Configuration of a Remote Control Device," U.S. Appl. No. 12/242,089, filed Sep. 30, 2008.

White, James Matthew et al. "Systems and Methods for Graphical Control of User Interface Features in a Television Receiver," U.S. Appl. No. 12/241,599, filed Sep. 30, 2008.

Coburn, Matthew et al. "Systems and Methods for Graphical Control of Symbol-Based Features in a Television Receiver," U.S. Appl. No. 12/241,604, filed Sep. 30, 2008.

White, James Matthew et al. "Systems and Methods for Graphical Adjustment of an Electronic Program Guide," U.S. Appl. No. 12/241,608, filed Sep. 30, 2008.

VanDuyn, Luke et al. "Methods and Apparatus for Presenting Supplemental Information in an Electronic Programming Guide," U.S. Appl. No. 12/235,476, filed Sep. 22, 2008.

VanDuyn, Luke et al. "Methods and Apparatus for Providing Multiple Channel Recall on a Television Receiver," U.S. Appl. No. 12/242,587, filed Sep. 30, 2008.

Martch, Henry Gregg et al. "Methods and Apparatus for Locating Content in an Electronic Programming Guide," U.S. Appl. No. 12/242,614, filed Oct. 17, 2008.

Taxier, Karen Michelle et al. "Apparatus and Methods for Dynamic Pictorial Image Authentication," U.S. Appl. No. 12/236,430, filed Sep. 23, 2008.

USPTO Non-Final Office Action mailed Apr. 17, 2012; U.S. Appl. No. 12/241,608, filed Sep. 30, 2008.

USPTO Non-Final Office Action mailed Mar. 22, 2012; U.S. Appl. No. 12/241,556, filed Sep. 30, 2008.

USPTO Final Office Action mailed Apr. 25, 2012; U.S. Appl. No. 12/242,614, filed Sep. 30, 2008.

USPTO Non-Final Office Action mailed Apr. 24, 2012; U.S. Appl. No. 12/235,476, filed Sep. 22, 2008.

United States Patent and Trademark Office, Office Action for U.S. Appl. No. 12/242,587, dated Jun. 5, 2012.

USPTO Final Office Action mailed Aug. 8, 2012 for U.S. Appl. No. 12/241,556, filed Sep. 30, 2008.

USPTO Non-Final Office Action mailed Jun. 28, 2012 for U.S. Appl. No. 12/241,571, filed Sep. 30, 2008.

USPTO Non-Final Office Action mailed Jul. 26, 2012 for U.S. Appl. No. 12/609,860, filed Oct. 30, 2008.

USPTO Final Office Action mailed Aug. 2, 2012 for U.S. Appl. No. 12/241,599, filed Sep. 30, 2008.

USPTO Final Office Action mailed Jul.17, 2012 for U.S. Appl. No. 12/241,580, filed Sep. 30, 2008.

USPTO Final Office Action mailed Aug. 1, 2012 for U.S. Appl. No. 12/241,608, filed Sep. 30, 2008.

USPTO Final Office Action mailed Aug. 9, 2012 for U.S. Appl. No. 12/241,476, filed Sep. 22, 2008.

USPTO "Final Office Action" mailed Sep. 14, 2012 for U.S. Appl. No. 12/242,587, filed Sep. 30, 2008.

Intellectual Property Office "Office Action" issued Oct. 25, 2012 for Taiwan Patent Appln. No. 098127906.

Ntellectual Property Office "Office Action" issued Oct. 30, 2012 for Taiwan Patent Appln. No. 098127902.

USPTO "Notice of Allowance" mailed Nov. 6, 2012 for U.S. Appl. No. 12/24,599, filed Sep. 30, 2008.

USPTO "Final Office Action" mailed Nov. 13, 2012 for U.S. Appl. No. 12/609,860, filed Oct. 30, 2009.

USPTO "Final Office Action" mailed Nov. 13, 2012 for U.S. Appl. No. 12/24,571, filed Sep. 30, 2008.

USPTO "Non'Final Office Action" mailed Nov. 15, 2012 for U.S. Appl. No. 12/241,608, filed Sep. 30, 2008.

USPTO "Non-Final Office Action" mailed Dec. 5, 2012 for U.S. Appl. No. 12/24,556, filed Sep. 30, 2008.

USPTO "Final Office Action" mailed Jan. 23, 2013 for U.S. Appl. No. 12/241,604, filed Sep. 30, 2008.

USPTO "Non'Final Office Action" mailed Feb. 12, 2013 for U.S. Appl. No. 12/235,476.

USPTO, "Notice of Allowance and Fee(s) Due" mailed May 7, 2013 for U.S. Appl. No. 12/241,608, filed Sep. 30, 2008.

USPTO, "Final Office Action" mailed Jun. 7, 2013 for U.S. Appl. No. 12/241,556.

USPTO, "Office Action" mailed Aug. 9, 2013 for U.S. Appl. No. 12/241,580.

USPTO, "Notice of Allowance and Fee(s) Due" mailed Aug. 14, 2013 for U.S. Appl. No. 12/235,476.

USPTO, "Office Action" mailed Aug. 19, 2013 for U.S. Appl. No. 12/241,604.

USPTO, Non-Final Office Action, dated Sep. 11, 2013 for U.S. Appl. No. 12/241,556.

USPTO, Non-Final Office Action, dated Sep. 17, 2103 for U.S. Appl. No. 12/242,587.

\* cited by examiner

METHODS AND APPARATUS FOR VISUALLY DISPLAYING RECORDING TIMER INFORMATION

BACKGROUND

Digital video recorders (DVRs) allow users to record television programs for later viewing. Typically, users set recording timers to record particular television programs at specified times. Recording conflicts occur if two or more recording timers occur at the same time or otherwise overlap. Recording conflict information is typically provided to the user in a list format, and the user is provided with options for resolving the time conflict. However, the list format is difficult for some users to review and determine the best option for resolving the recording conflict. The problem is further exacerbated by the availability of multiple tuner DVRs that allow recording timers to be assigned to multiple television tuners of the DVR

BRIEF DESCRIPTION OF THE DRAWINGS

The same number represents the same element or same type of element in all drawings.

DETAILED DESCRIPTION

The various embodiments described herein generally provide apparatus, systems and methods which facilitate the display of television recording information to users. More particularly, television recording information is presented visually to a user in a visual recording information menu. The visual recording information menu includes a time axis, and recording timers associated with particular television programs are presented visually along the time axis. A user may scroll along the time axis to view the recording timers for the DVR. In short, the various embodiments described herein generally provide apparatus, systems and methods for visually displaying recording timer information.

In at least one embodiment, a DVR identifies a recording conflict between two or more television programs and visually displays the recording conflict in the recording information menu. For example, a portion of a visual representation of a first recording timer corresponding with a time period of the recording conflict may be overlaid on a portion of a visual representation of the second recording timer to indicate the existence of the recording conflict. A user may then provide input to resolve the recording conflict.

In some embodiments, the recording information menu presents recording information regarding multiple television tuners utilized to record television programs. For example, an interface menu may include both a time axis and a resource axis, with the resource axis separately presenting visual representations of recording timers associated with each television tuner of the DVR. In one embodiment, the recording information is presented in a grid, with rows of the grid corresponding with particular television tuners, and columns of the grid corresponding with recording time slots. A user may then view recording timers, identify recording conflicts and provide input to resolve the conflicts, such as switching a recording timer to a different television tuner.

Figures 1, 2:
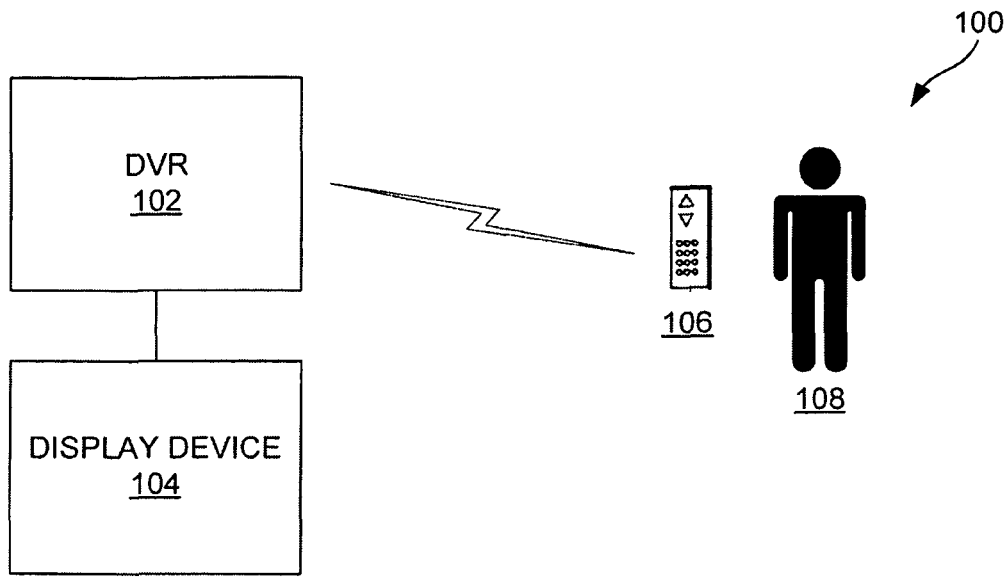
FIG. 1 illustrates an embodiment of an entertainment system.
FIG. 2 illustrates a screenshot of an embodiment of an electronic programming guide outputted by the DVR of FIG. 1.

FIG. 1 illustrates an embodiment of an entertainment system 100. The entertainment system 100 presents content to a user 108. In at least one embodiment, the content presented to the user 108 includes an audio/video stream, such as a television program, movie or other recorded content and the like. The entertainment system 100 includes a DVR 102, a display device 104 and a remote control 106. Each of these components is discussed in greater detail below. The entertainment system 100 may include other devices, components or elements not illustrated for the sake of brevity.

The DVR 102 is operable to receive content from one or more content sources (not shown in FIG. 1) and record the received content for subsequent presentation to the user 108. The DVR 102 is further operable to output the recorded content for presentation by the display device 104. More particularly, the DVR 102 is operable to receive, demodulate and record a television signal from a programming source, such as a satellite, cable, internet, terrestrial or other type of television transmission signal. The DVR 102 may receive an audio/video stream in any format (e.g., analog or digital format). Likewise, the DVR 102 may output the audio/video stream for presentation by the display device 104 in any type of format. In at least one embodiment, the DVR 102 is a set-top box (e.g., a satellite or cable television receiver or converter box) or other similar device that processes and provides one or more audio and/or video output streams to the display device 104 for presentation to the user 108. The DVR 102 may be further configured to output for display menus and other information that allow a user 108 to control the recording and output of content by the DVR 102. For example, as described in further detail below, the DVR 102 may output menus regarding recording information (e.g., recording timers and the like) for review by the user 108.

Responsive to particular recording timers, the DVR 102 coordinates the reception of video signals associated with a television program through a television receiving resource (e.g., a television tuner) and storage of the video signal onto a storage medium (e.g., a hard drive). The DVR 102 may include any number of television receiving resources utilized for receiving television programs. A DVR 102 minimally includes at least one television receiving resource to receive and record video signals associated with a television program. The DVR 102 may include multiple television receiving resources to record multiple television programs simultaneously. In at least one embodiment, the DVR 102 may include multiple types of television receiving resources, such as an over-the-air (ATA) tuner and a satellite and/or cable television tuner. In some embodiments, the DVR 102 may be operable to assign a recording timer associated with a particular program to a specified television receiving resource. For example, a first television program, broadcast between 7:00 P.M. and 8:00 P.M., may be assigned to a first satellite television tuner of the DVR 102, and a second television program, broadcast between 7:00 P.M. and 9:00 P.M., may be assigned to a second satellite television tuner of the DVR 102.

Priorities may also be assigned to particular recording timers to provide the DVR 102 with information for resolving recording conflicts. Thus, if a recording conflict occurs between two or more recording timers, then the DVR 102 may apply rules to the priority information to determine which program to record absent input by the user 108 resolving the conflict. For example, the earliest set recording timer may have the highest priority for recording. Similarly, a more recently set recording timer may have the highest priority for recording. In some embodiments, a user 108 may provide a recording priority for a particular timer when selecting the timer for recording. Thus, the particular rules applied by the DVR 102 for resolving recording conflicts may be determined based on desired design criteria.

The display device 104 may comprise any type of device capable of receiving and outputting a video signal in any format. Exemplary embodiments of the display device 104 include a television, a computer monitor, a liquid crystal display (LCD) screen, a touch screen and a projector. The display device 104 and the DVR 102 may be communicatively coupled through any type of wired or wireless interface. For example, the display device 104 may be communicatively coupled to the DVR 102 through a coaxial cable, component or composite video cables, an HDMI cable, a VGA or SVGA cable, a Bluetooth or WiFi wireless connection or the like. In at least one embodiment, the DVR 102 and the display device 104 may be integrated as a device combining the functionality of a display device and a DVR/television receiver.

The remote control 106 may comprise any system or apparatus configured to remotely control the output of content by the DVR 102. The remote control 106 may minimally include a transmitter, an input device (e.g., a keypad) and a processor for controlling the operation of the remote control 106. The remote control 106 may communicate commands to the DVR 102 requesting to playback content, temporally move through content (e.g., fast-forward or reverse), adjust the volume, access electronic programming guides, set or edit recording timers and the like. In some embodiments, the remote control 106 may additionally be configured to remotely control the display device 104. The remote control 106 may communicate with the DVR 102 and/or the display device 104 through any type of wireless communication medium, such as infrared (IR) signals or radio-frequency (RF) signals.

The remote control 106 may include any type of man-machine interface for receiving input from the user 108. For example, the remote control 106 may include buttons for receiving input from the user 108. In at least one embodiment, the remote control 106 includes a touch pad for receiving input from the user 108. The remote control 106 may further include a trigger, utilized in association with the touch pad, for allowing the user to input information associated with the menus displayed on-screen.

During a viewing session, the user 108 requests to record one or more television programs receivable by the DVR 102. For example, a user 108 may access an electronic programming guide through the DVR 102 to view upcoming television programs and select one or more of the television programs for recording. FIG. 2 illustrates a screenshot of an embodiment of an electronic programming guide 200 outputted by the DVR 102 of FIG. 1. The electronic programming guide 200 graphically displays television programs for multiple channels and time slots in a grid format. In the illustrated embodiment, time slots are arranged along a horizontal axis of the electronic programming guide 200 and channels are arranged along a vertical axis of the electronic programming guide 200. The user 108 may scroll along both the horizontal and vertical axes of the electronic programming guide to locate programs of interest for recording. The user 108 may then provide input to the DVR 102, via the remote control 106, requesting to record particular programs listed in the electronic programming guide 200.

Occasionally, recording conflicts occur on a DVR 102 if two or more programs are to be recorded at the same time or during overlapping time periods. For example, a first program may be set for recording between 7:30 P.M. and 8:00 P.M., and a second program may be set for recording between 7:00 P.M. and 8:00 P.M. Thus, if the DVR 102 has only a single television receiving resource, then one of the television shows may not be recorded.

Another common problem occurs if a recording timer includes a buffer period at the beginning and/or ending of the time period to account for programs that start early and/or run past the allotted time. For example, a recording timer for a program that runs from 7:00 P.M. to 8:00 P.M. may be set for 6:57 P.M. to 8:03 P.M. If another program is set for recording from 8:00 P.M. to 9:00 P.M., then the buffer period for the first program may prevent recording of the entire second program depending on the priority rules applied by the DVR 102.

Figure 3:
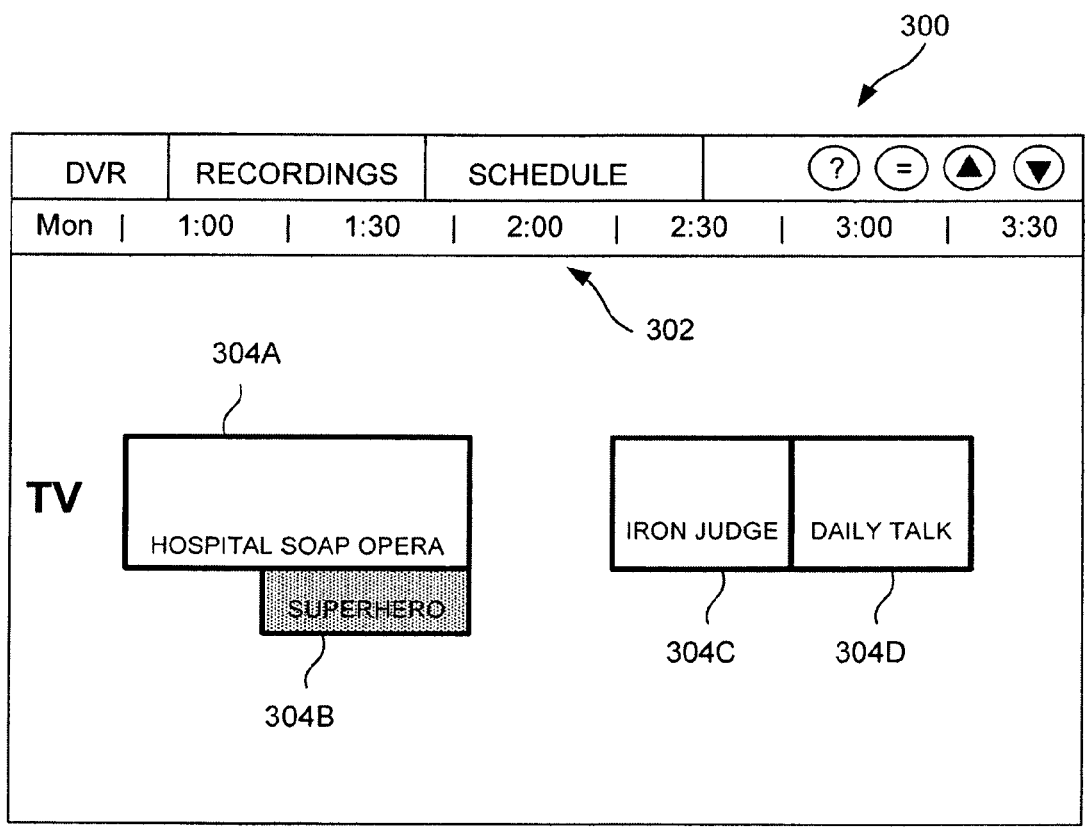
FIG. 3 illustrates a screenshot of an embodiment of a recording timer user interface menu outputted by the DVR of FIG. 1.

Thus, in accordance with at least one embodiment, the DVR 102 is operable to output a recording timer user interface for displaying recording timer information visually to the user 108. FIG. 3 illustrates a screenshot of an embodiment of a recording timer user interface menu 300 outputted by the DVR 102 of FIG. 1. The user interface menu 300 includes a time axis 302, which in the illustrated embodiment is arranged in a horizontal direction of the user interface menu 300. However, it is to be appreciated that the time axis may also be arranged along other axes of the user interface menu 300.

As illustrated in FIG. 3, the user interface menu 300 includes a plurality of visual representations 304A-304D corresponding with recording timers of the DVR 102. More particularly, each visual representation 304A-304D has a length along the time axis 302 corresponding to the duration of the recording timer. For example, visual representation 304A corresponds with a recording timer for a television program that is broadcast between 1:00 P.M. and 2:00 P.M. Additionally, the recording timer has a buffer of 3 minutes on each end of the television program. Thus, the visual representation 304A starts slightly before the 1:00 P.M. timer marker of the time axis 302 and ends slightly after the 2:00 P.M. time mark of the time axis 302.

When generating the user interface menu 300, the DVR 102 identifies recording conflicts between multiple timers corresponding with multiple television programs. More particularly, a recording conflict occurs during a conflict time period if the recording timers for each television program overlap. In the illustrated example of FIG. 3, a recording conflict occurs between the recording timer associated with visual representation 304A and the recording timer associated with visual representation 304B. For example, the Hospital Soap Opera television program is associated with a recording timer from 12:57 P.M. and 2:03 P.M., whereas the Superhero television program is associated with a recording timer from 1:27 P.M. to 2:03 P.M. Further, the Hospital Soap Opera television program has a higher recording priority than the Superhero television program.

To assist the user 108 in identifying the recording conflict, the DVR 102 presents the visual representation 304A and the visual representation 304B simultaneously along the time axis 302. The DVR 102 further overlays a portion of the visual representation 304A over a portion of the visual representation 304B corresponding with the conflict time period. In other words, the visual representation 304A is overlaid over the visual representation 304B along the 1:27 P.M. to 2:03 P.M. portion of the time axis 302.

To further accentuate the recording conflict, the DVR 102 offsets the visual representation 304A along the vertical axis of the user interface menu 300, which is disparate from the time axis 302. Thus, because the visual representation 304B is offset from the other visual representations 304A, 304C and 304D, the user 108 may recognize right away that the Superhero television program will not be recorded by the DVR 102 because of the time conflict. The DVR 102 may optionally display a visual indicator on the visual representation 304B that indicates the Superhero television program will not be recorded. As illustrated in FIG. 3, the visual representation 304B includes cross hatching to indicate the non-recording of a particular television program. However, other visual indicators, such as colored overlays (e.g., red) may also be utilized to indicate the non-recording of the television programs to the user 108. Thus, the user 108 may identify programs that will not be recorded, and if necessary, resolve the conflict to enable recording of the lower priority programs.

To resolve the recording conflict, the user 108 may provide additional user input to change parameters of the recording timers associated with the recording conflict. The DVR 102 updates the particular recording timers responsive to the user input. For example, the user 108 may decide that they would rather record the Superhero television program. Thus, they may change the priority of the conflicted recording timers. In at least one embodiment, the user 108 utilizes the remote control 106 to swap the positions of the visual representations 304A and 304B, changing the recording priorities of the associated recording timers.

Figure 4:
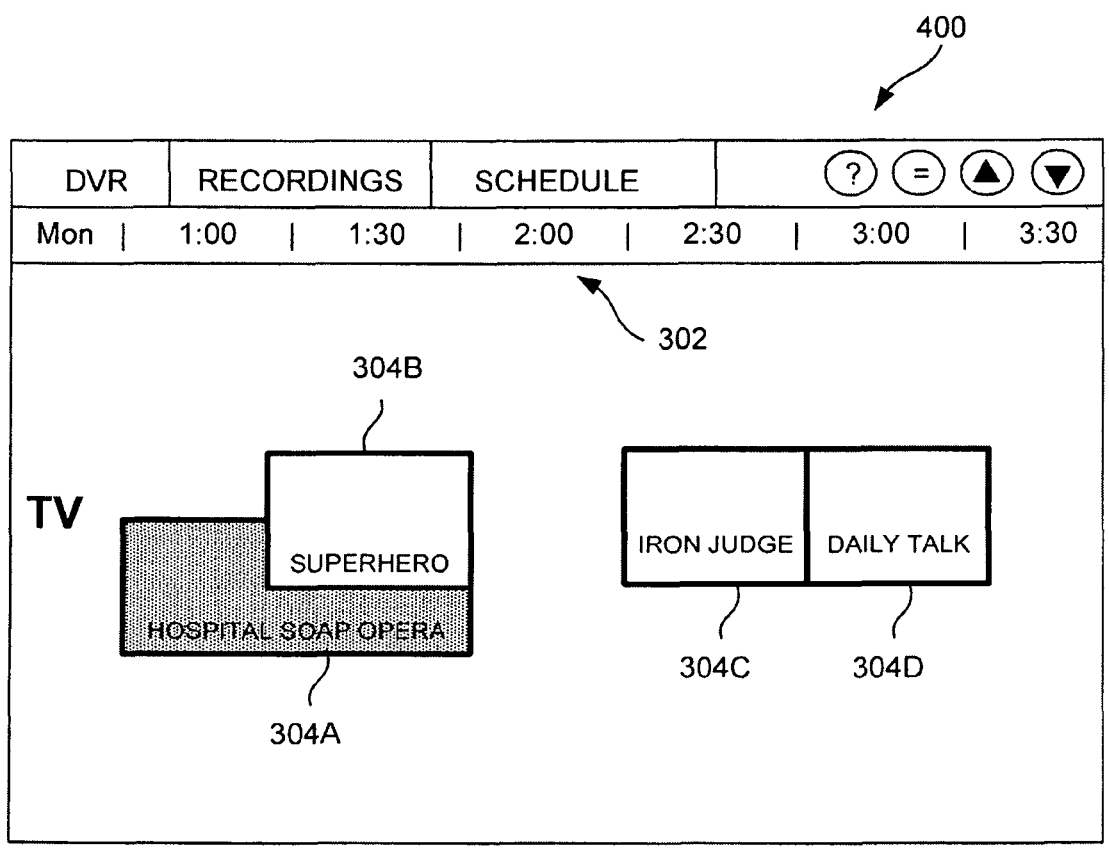
FIG. 4 illustrates another screenshot of an embodiment of a recording timer user interface menu outputted by the DVR of FIG. 1.

FIG. 4 illustrates another screenshot of an embodiment of a recording timer user interface menu 400 outputted by the DVR 102 of FIG. 1. More particularly, FIG. 4 illustrates the user interface menu 400 after the user 108 swaps the positions of the visual representations 304A and 304B. As illustrated in FIG. 4, a portion of the visual representation 304B is overlaid on a portion of the visual representation 304A corresponding to the conflict time period. The visual representation 304A is now offset below the visual representation 304B along the vertical axis of the user interface menu 400, again illustrating the recording conflict. Further, the visual representation 304A includes a visual indicator indicating that the Hospital Soap Opera will not be recorded. Likewise, the visual indicator on the visual representation 304B has been removed, indicating that the Superhero television program will be recorded.

Figure 5:
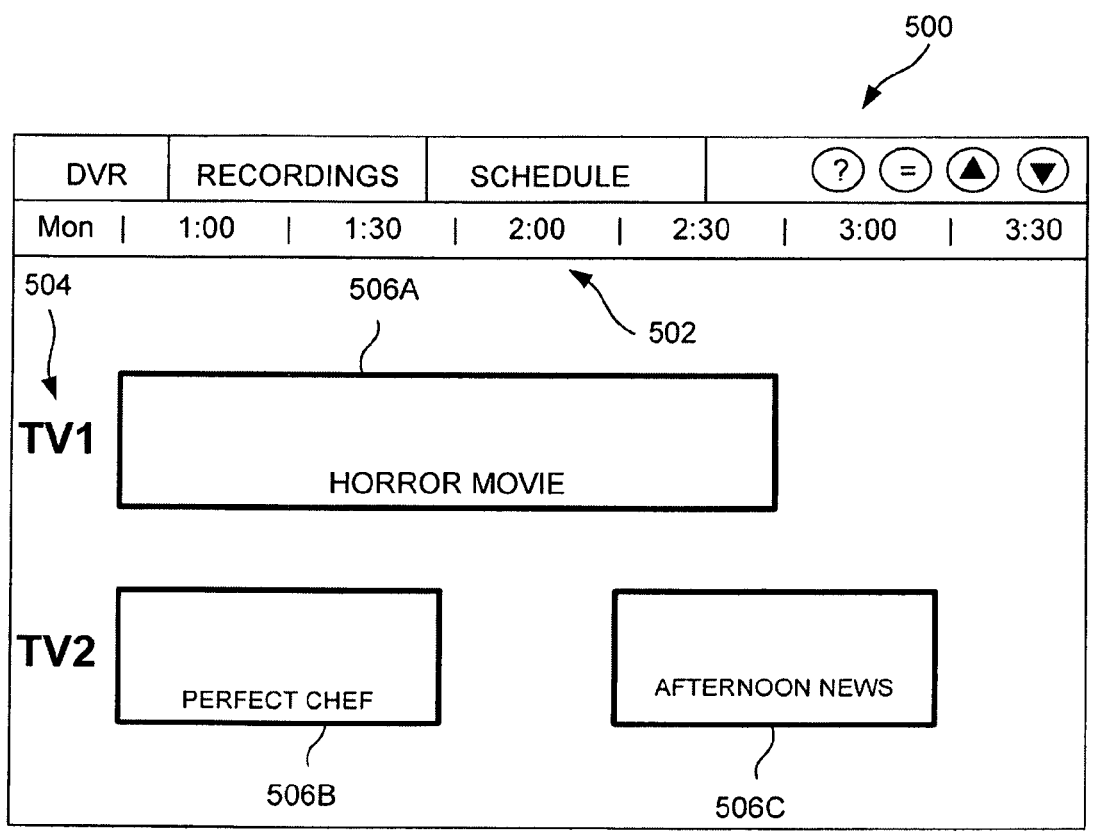
FIG. 5 illustrates a screenshot of an embodiment of a multiple tuner recording timer user interface menu outputted by the DVR of FIG. 1.

In at least one embodiment, the DVR 102 may include multiple television receiving resources, such as multiple satellite or cable television tuners, that allow the DVR 102 to record multiple television programs simultaneously. Each television program may be selectively assigned for reception by one or more of the television receiving resources based on input by the user 108 and/or rules applied by the DVR 102. FIG. 5 illustrates a screenshot of an embodiment of a multiple tuner recording timer user interface menu 500 outputted by the DVR 102 of FIG. 1. The user interface menu 500 includes a time axis 502 and a resource axis 504. The resource axis 504 separately presents the recording timers associated with each of the multiple television receiving resources of the DVR 102. In the illustrated embodiment, the DVR 102 includes a first television receiving resource (TV1) and a second television receiving resource (TV2).

Like the user interface menus 300 and 400, the recording timer user interface menu 500 includes a plurality of visual representations 506A-506C that are associated with recording timers for various television programs. More particularly, each recording timer is assigned to a particular television receiving resource. Thus, visual representations of recording timers associated with the first television receiving resource are presented along a first portion of the resource axis 504. Similarly, visual representations of recording timers associated with the second television receiving resource are presented along a second portion of the resource axis 504. The visual representations 506A-506C are also positioned along a portion of the time axis associated with a beginning time and an ending time of the associated recording timer.

In FIG. 5, the visual representation 506A is associated with the TV1 receiving resource. Similarly, the visual representations 506B and 506C are associated with the TV2 receiving resource. Thus, when viewing the user interface menu 500, the user 108 is able to easily see what is going to be recorded by each television receiving resource during each time period.

Figure 6:
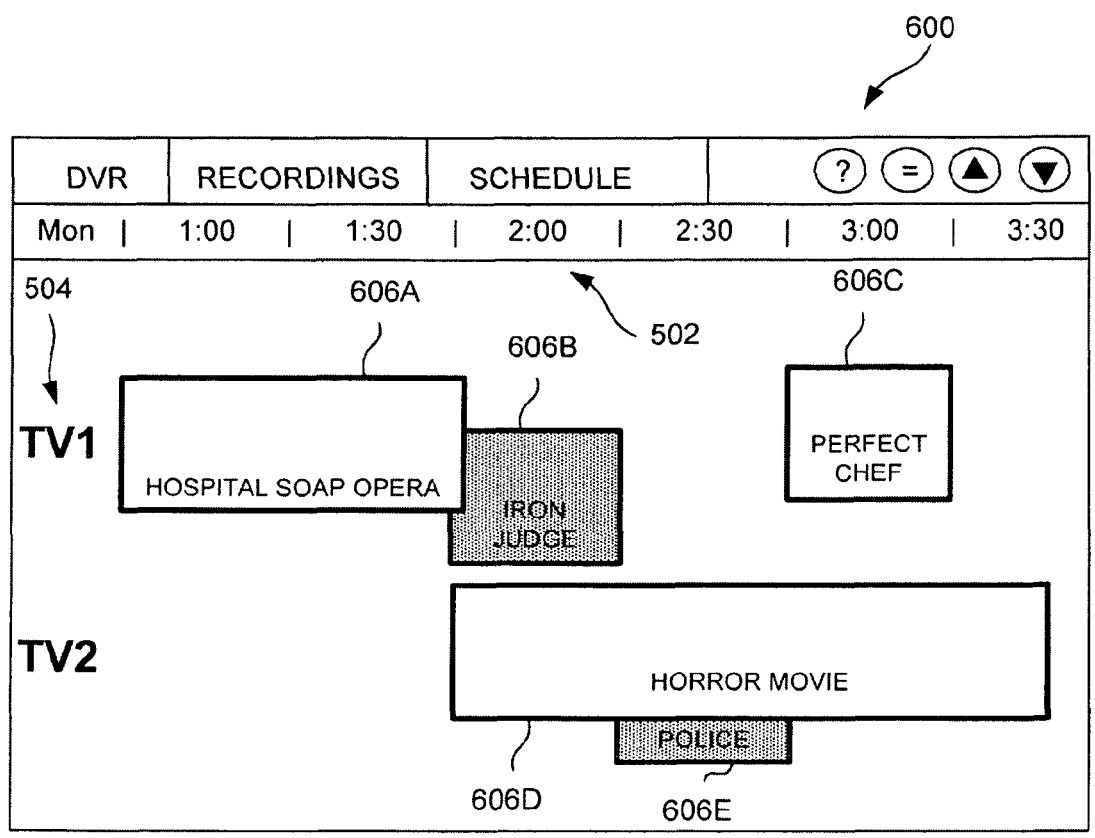
FIG. 6 illustrates a screenshot of another embodiment of a multiple tuner recording user interface menu outputted by the DVR of FIG. 1.

Even though the DVR 102 includes multiple television receiving resources, recording conflicts may still occur for the same reasons as when the DVR 102 includes one television receiving resource. However, multiple television receiving resources give the user 108 more flexibility in resolving recording conflicts to achieve more optimal recording solutions, e.g., to record more television programs. The user interface menu 500 is advantageously useful to the user 108 for easily identifying recording conflicts to determine optimal solutions for recording the most number of television programs. FIG. 6 illustrates a screenshot of another embodiment of a multiple tuner recording user interface menu 600 outputted by the DVR 102 of FIG. 1.

The multiple television receiving resource embodiment of the DVR 102 may operate similarly to the single television receiving resource embodiment of the DVR 102 described in regard to FIGS. 2-4 to identify and present information to the user 108 regarding recording conflicts. As illustrated in FIG. 6, the user interface menu 600 includes visual representations 606A-606E of five recording timers. Visual representations 606A-606C are associated with a first television receiving resource of the DVR 102, and visual representations 606D-606E are associated with a second television receiving resource.

As indicated in FIG. 6, a first recording conflict occurs between the recording timer associated with visual representation 606A and the recording timer associated with visual representation 606B. More particularly, the recording timer for the Hospital Soap Opera television program is set to record from 1:00 P.M. to 2:03 P.M., and the recording timer for the Iron Judge television program is set to record from 1:59 P.M. to 2:30 P.M. Because both recording timers require the same television receiving resource during an overlapping conflict time period, the Iron Judge television program is not set to record.

However, the user 108 may decide that the buffer periods of each recording timer are not as important as recording the Iron Judge. Thus, the user 108 may provide input requesting to modify the time boundary of one or both recording timers to resolve the recording conflict such that each television program is recorded. For example, the user 108 may drag the edges of one or both of visual representations 606A and 606B to modify the time boundaries of the associated recording timer. The user 108 may also click on either visual representation 606A to 606B to modify the parameters of the associated recording timer. Thus, in at least one embodiment, the DVR 102 may present the user with a parameter editing menu, responsive to the user 108 clicking on a particular visual representation, that allows the user 108 to modify the parameters of the associated recording timer.

Figure 7:
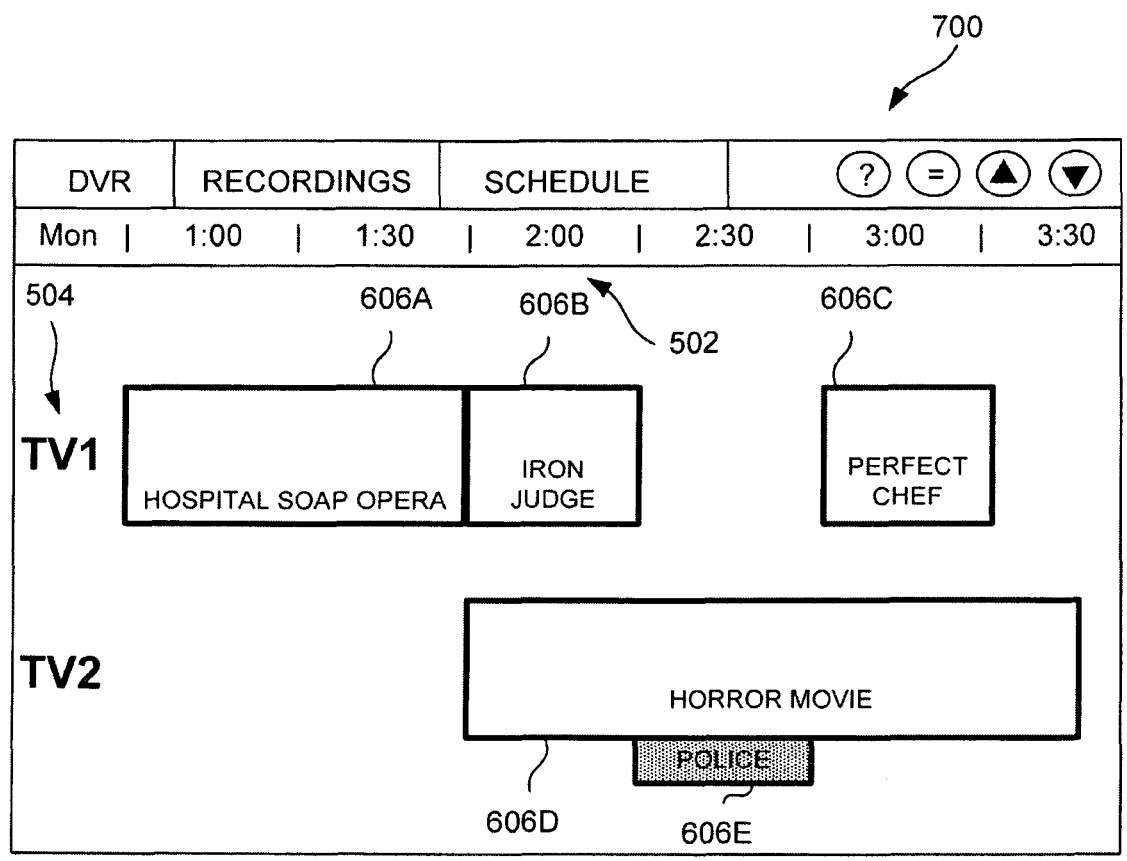
FIG. 7 illustrates a screenshot of another embodiment of a multiple tuner recording user interface menu outputted by the DVR of FIG. 1.

FIG. 7 illustrates a screenshot of another embodiment of a multiple tuner recording user interface menu 700 outputted by the DVR 102 of FIG. 1. More particularly, the user interface menu 700 is outputted responsive to the user modifying the time boundary of one or both of the recording timers associated with visual representations 606A and 606B. Because the recording timers no longer overlap, the visual representation 606A is no longer overlaid on the visual representation 606B. Rather, the visual representation 606B is arranged adjacent to the visual representation 606A along the time axis 502. Further, the visual representation 606B no longer includes a visual indicator because the associated television program will now be recorded.

As further illustrated in FIG. 7, another recording conflict occurs between the recording timer for the Horror Movie (illustrated as visual representation 606D) and the recording timer for the Police television show (illustrated as visual representation 606D). While both recording timers are assigned to the second television receiving resource, the user 108 may identify, while viewing the user interface menu 700, that a time slot is open on the first television receiving resource that would accommodate the recording timer for the Police television show. Thus, the user 108 may provide user input requesting to assign the recording timer for the Police television show to the first television receiving resource. For example, the user 108 may drag the visual representation 606E to the portion of the resource axis associated with the first television receiving resource.

Figure 8:
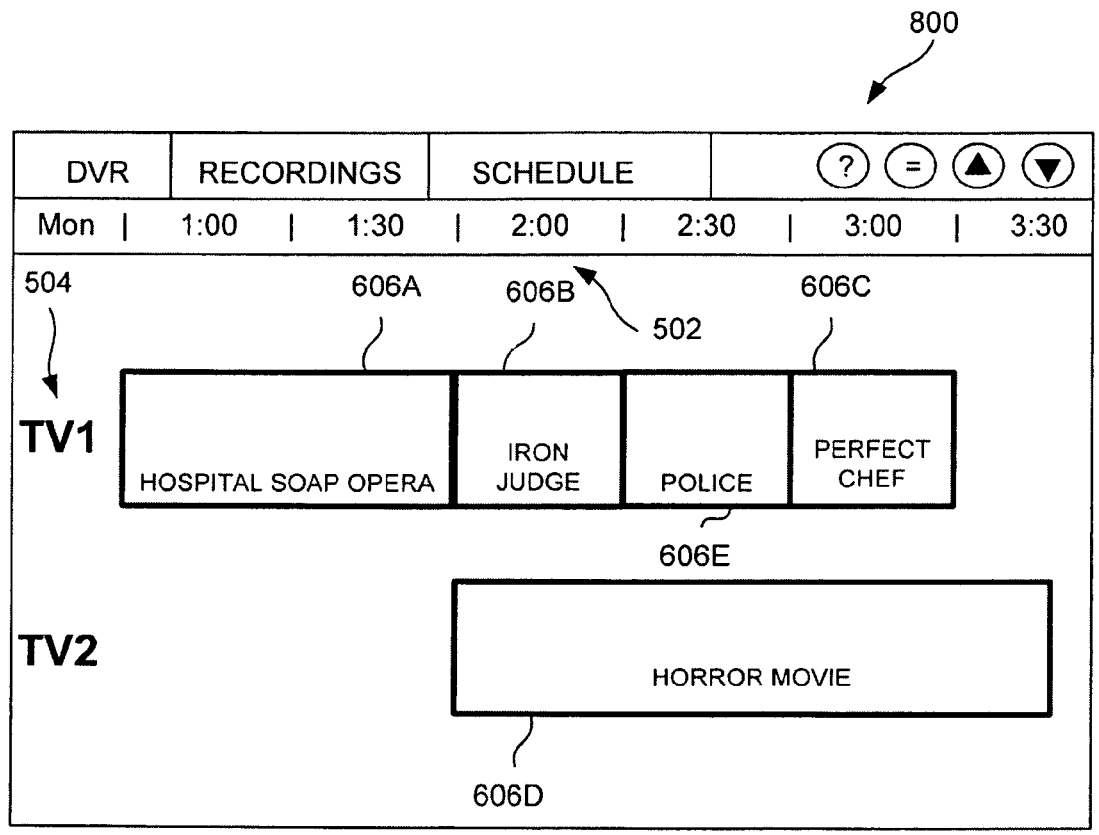
FIG. 8 illustrates a screenshot of another embodiment of a recording timer user interface menu outputted by the DVR of FIG. 1.

FIG. 8 illustrates a screenshot of another embodiment of a recording timer user interface menu 800 outputted by the DVR 102 of FIG. 1. As illustrated in FIG. 8, the visual representation 606E is now arranged along the portion of the resource axis associated with the first television receiving resource. The visual representation 606E is further positioned adjacent the visual representation 606B and the visual representation 606C. Also, the visual representation 606E no longer includes hatching because the Police television show will be recorded. The visual recording timer display user interface menu 800 outputted by the DVR 102 allows the user 108 to identify possible modifications to the recording timers to utilize the DVR 102 in a more efficient manner to resolve recording conflicts.

Figure 9:
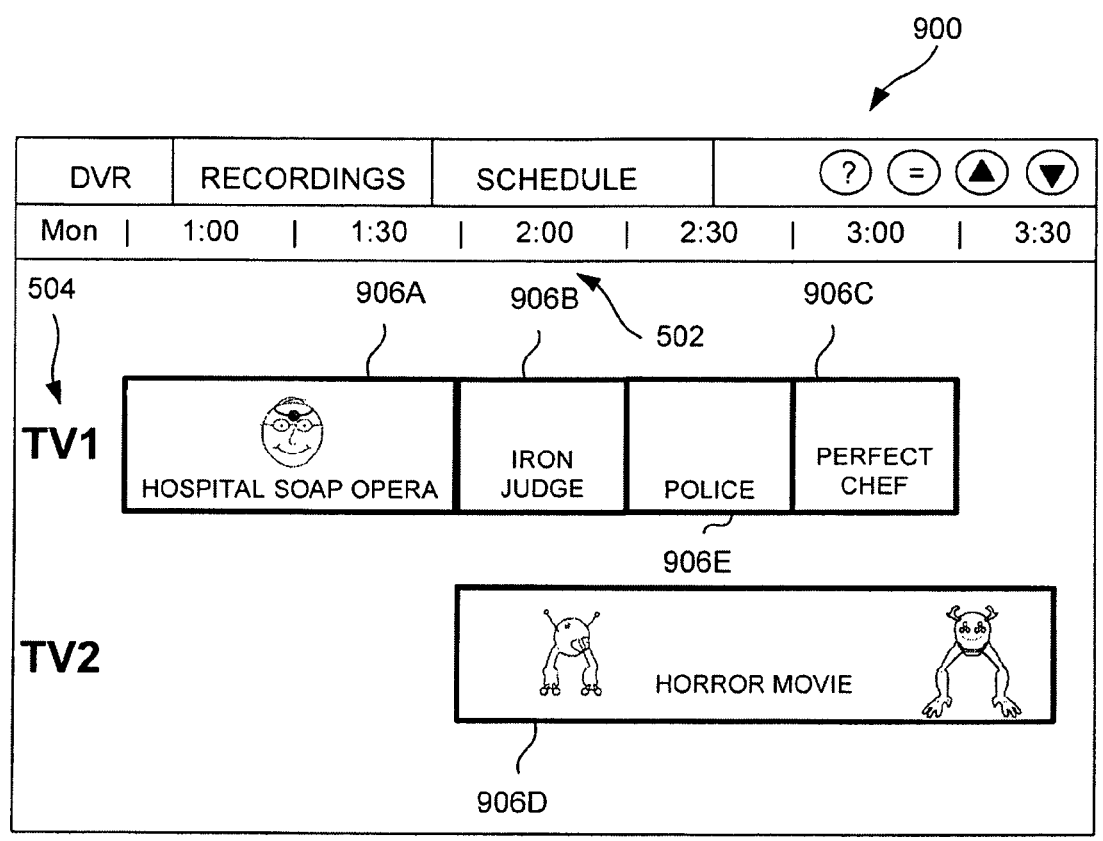
FIG. 9 illustrates a screenshot of another embodiment of a recording timer user interface menu outputted by the DVR of FIG. 1.

In at least one embodiment, the visual representations of recording timers may include pictures associated with a particular television program. FIG. 9 illustrates a screenshot of another embodiment of a recording timer user interface menu 900 outputted by the DVR 102 of FIG. 1. The user interface menu 900 is similar to the user interface menus 500-800 of FIGS. 5-8. More particularly, the user interface menu 900 includes visual representations 906A-906E that correspond with recording timers for particular television programs. As illustrated in FIG. 9, visual representations 906A and 906D include pictures associated with the corresponding television programs. The pictures may be icons of characters, objects or the like of the program, or may include screenshots or the like of the television program. In at least one embodiment, the pictorial data may be stored on the DVR 102 and be associated with an electronic programming guide outputted by the DVR 102. In other embodiments, the pictures may be retrieved from an external server responsive to the user setting the recording timer for the television program. In at least one embodiment, the pictures may comprise user selected icons, images and the like.

Figure 10:
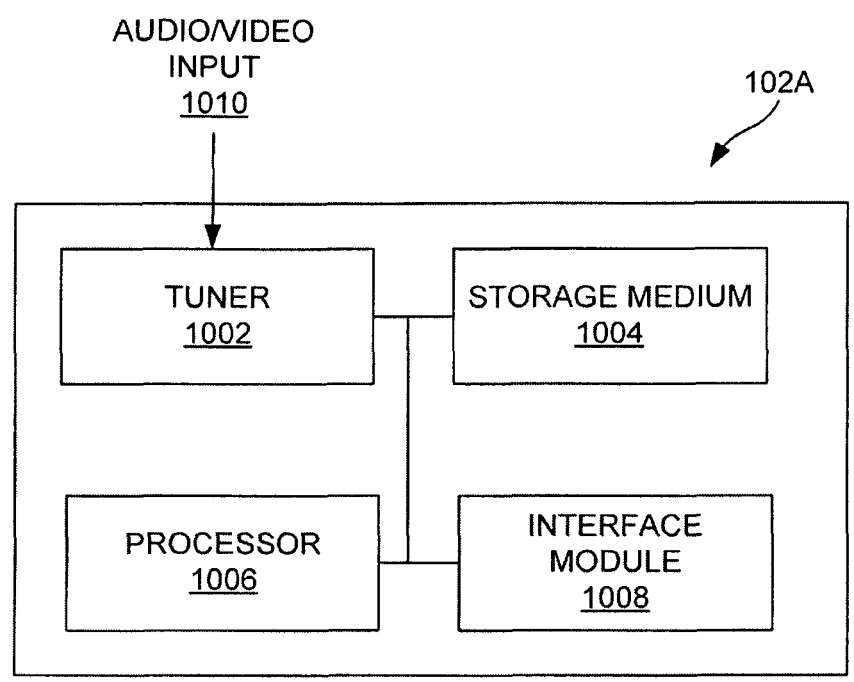
FIG. 10 illustrates an embodiment of a DVR of FIG. 1.

FIG. 10 illustrates an embodiment of a DVR of FIG. 1. FIG. 10 will be discussed in reference to the entertainment system 100 illustrated in FIG. 1. The DVR 102A includes a tuner 1002, a storage medium 1004, a processor 1006 and an interface module 1008. Each of these components will be discussed in greater detail below. The DVR 102A may include other elements, components or devices which are not illustrated for the sake of brevity.

The tuner 1002 is operable to receive an audio/video input 1010 from a content source. More particularly, the tuner 1002 receives and tunes a television signal including television programming. The tuner 1002 may receive an over-the-air broadcast, a direct broadcast satellite signal, a cable television signal or an internet protocol television (IPTV) signal and tune the audio/video input 1010 to extract the selected television programming. In at least one embodiment, the DVR 102A may include multiple tuners 1002, utilized by the user 108, to view and/or record multiple television programs simultaneously.

The storage medium 1004 is operable to persistently store video signals recorded by the DVR 102A. The storage medium 1004 may comprise any type of non-volatile memory appropriate for storing video signals recorded by the DVR 102A. Exemplary storage mediums 1004 include hard drives (e.g., magnetic memory), flash memory and the like. In at least one embodiment, the storage medium 1004 may be internally located within the DVR 102A. In other embodiments, the storage medium 1004 may be located external with respect to the DVR 102A. The DVR 102A may also utilize a combination of internal and external storage mediums 1004 for storage of video signals.

The processor 1006 is operable to control the operation of the DVR 102A. The processor 1006 may be a single processing device or a plurality of processing devices that cooperatively operate to control the operation of the DVR 102A. The processor 1006 may include various components or modules for processing and outputting audio/video content. Exemplary components or modules for processing audio/video content include a demodulator, a decoder, a decompressor, a conditional access module and a transcoder module.

The processor 1006 coordinates storage of the audio/video input 1010 onto the storage medium 1004. The processor 1006 may also be operable to generate an audio/video output stream based on the audio/video input 1010, e.g. pass through the signal for display by an associated display device 104. The processor 1006 is also operable to retrieve stored video content to generate an audio/video output stream for display by the display device 104. An audio/video output stream is outputted to the display device 104 (see FIG. 1) for presentation to the user 108. The processor 1006 may incorporate circuitry to output the audio/video streams in any format recognizable by the display device 104, including composite video, component video, Digital Visual Interface (DVI) and High-Definition Multimedia Interface (HDMI). The processor 1006 may also incorporate circuitry to support multiple types of these or other audio/video formats. In at least one embodiment, as described above, the DVR 102A may be integrated with the display device 104, and the processor 1006 may be operable to control the presentation of the audio/video output stream.

To coordinate the storage of the audio/video input 1010, the processor 1006 is operable to receive user input requesting to record one or more television programs. Responsively, the processor 1006 sets recording timers associated with the television programs. The processor 1006 is further operable to output user interface menus, such as the user interface menus 200-900 illustrated in FIGS. 2-9, to allow the user 108 to view the recording timers, modify recording timers, identify recording conflicts and provide input for resolving the recording conflicts in a desired manner.

The interface module 1008 is operable to wirelessly receive data from the remote control 106. The interface module 1008 may communicate with the remote control 106 utilizing any type of IR or RF communication link. In at least one embodiment, the interface module 1008 receives a key code from the remote control 106, and responsively provides the key code to the processor 1006. In some embodiments, the interface module 1008 may receive positional information from a scrolling device of the remote control 106, e.g., a touch pad, scroll wheel or the like. Some of the data received by the interface module 1008 may request to set and/or modify recording timers as described above. The processor 1006 processes the data received by the interface module 1008 to set and update recording timers in accordance with the embodiments described above.

Those of ordinary skill in the art will appreciate that the various functional elements 1002 through 1008 shown as operable within the DVR 102A may be combined into fewer discrete elements or may be broken up into a larger number of discrete functional elements as a matter of design choice. Thus, the particular functional decomposition suggested by FIG. 10 is intended merely as exemplary of one possible functional decomposition of elements within the DVR 102A.

Figure 11:
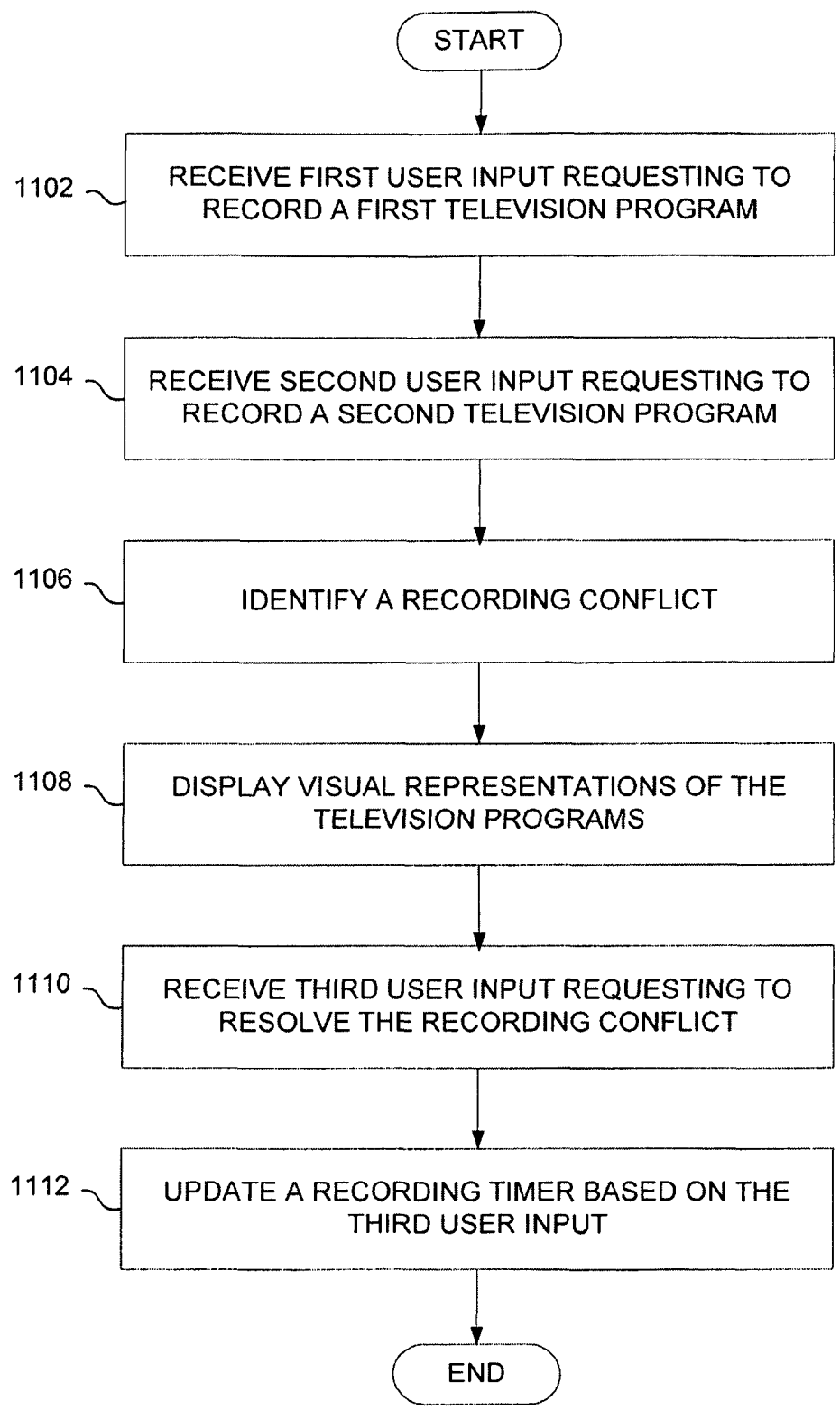
FIG. 11 illustrates an embodiment of a process for visually displaying television recording information.

FIG. 11 illustrates an embodiment of a process for visually displaying television recording timer information. More particularly, the process of FIG. 11 is operable to resolve recording conflicts between two or more recording timers associated with a DVR. The process of FIG. 11 may include other operations not illustrated for the sake of brevity.

The process includes receiving first user input requesting to record a first television program (operation 1102). For example, a user may select a program for recording via an electronic programming guide menu. The process further includes receiving second user input requesting to record a second television program (operation 1104).

The process further includes identifying a recording conflict between a first television program and a second television program during a conflict time period (operation 1106). In at least one embodiment, identifying the recording conflict may be performed responsive to the second user input received in operation 1104. In other embodiments, identifying the recording conflict may be performed responsive to other events, such as modification of a recording timer or user input requesting to view a recording timer schedule.

In at least one embodiment, a DVR may initially apply priority rules to determine which television program to record given the recording conflict. For example, the higher priority television program may be set for recording. In some embodiments, the DVR prompts the user to resolve the conflict rather than automatically applying priority rules to determine which program should be recorded given the recording conflict.

The process further includes displaying a user interface menu including visual representations of the television programs and the associated recording timers (operation 1108). More particularly, the user interface menu includes a time axis, a first visual representation of the first television program and a second visual representation of the second television program. At least a portion of the first visual representation is overlaid on a portion of the second visual representation along the time axis corresponding to the conflict time period. In some embodiments, the second visual representation may be offset from the first visual representation along an axis of the user interface menu disparate from the time axis. Still further, the second visual representation may include a visual indicator that indicates the second television program will not be recorded. In some embodiments, the first and/or second visual representations may be displayed with pictures corresponding to the first and second television programs.

In at least one embodiment, the user interface menu may be displayed to the user responsive to identifying the recording conflict in operation 1108. In other words, a DVR identifies a recording conflict and displays the user interface menu as a prompt for the user to resolve the recording conflict. In other embodiments, the user interface menu may be displayed responsive to a request by a user to view a television recording timer schedule.

The process further includes receiving third user input requesting to resolve the recording conflict (operation 1110). In at least one embodiment, a user may request to modify a time boundary of a recording time associated with the first and/or second television program. For example, if the first recording timer for the first television program ends at 7:01 P.M. and the recording timer for the second television program starts at 7:00 P.M., then the user may modify the first recording timer to end at 7:00 P.M. such that no overlap between the recording timers occurs.

In some embodiments, the third user input may request to swap positions of the first and second visual representations. In other words, the user may request to change the relative priorities of the recording timers associated with the first and second television programs. Thus, the process may further include displaying a portion of the second visual representation overlaid over a portion of the first visual representation, indicating that the second television program has a higher recording priority than the first television program. In at least one embodiment, the user interface menu may include recording timer information associated with multiple television receiving resources, and the third user input may request to swap the television receiving resource associated with the first or second television program and a third television program associated with a disparate television receiving resource. Thus, for example, the first television program may be recorded using a second television receiving resource whereas the third television program may be recorded using the television receiving resource originally associated the first television receiving resource.

The process further includes updating at least one recording timer, associated with the recording conflict, based on the third user input (operation 1112). For example, if the user input requests modification of a time boundary of one of the recording timers, then the process may include updating a recording time of a recording timer associated with the television program based on the modified time boundary. In another embodiment, operation 1112 may include modifying a recording priority of the second recording timer based on the third user input.

Figure 12:
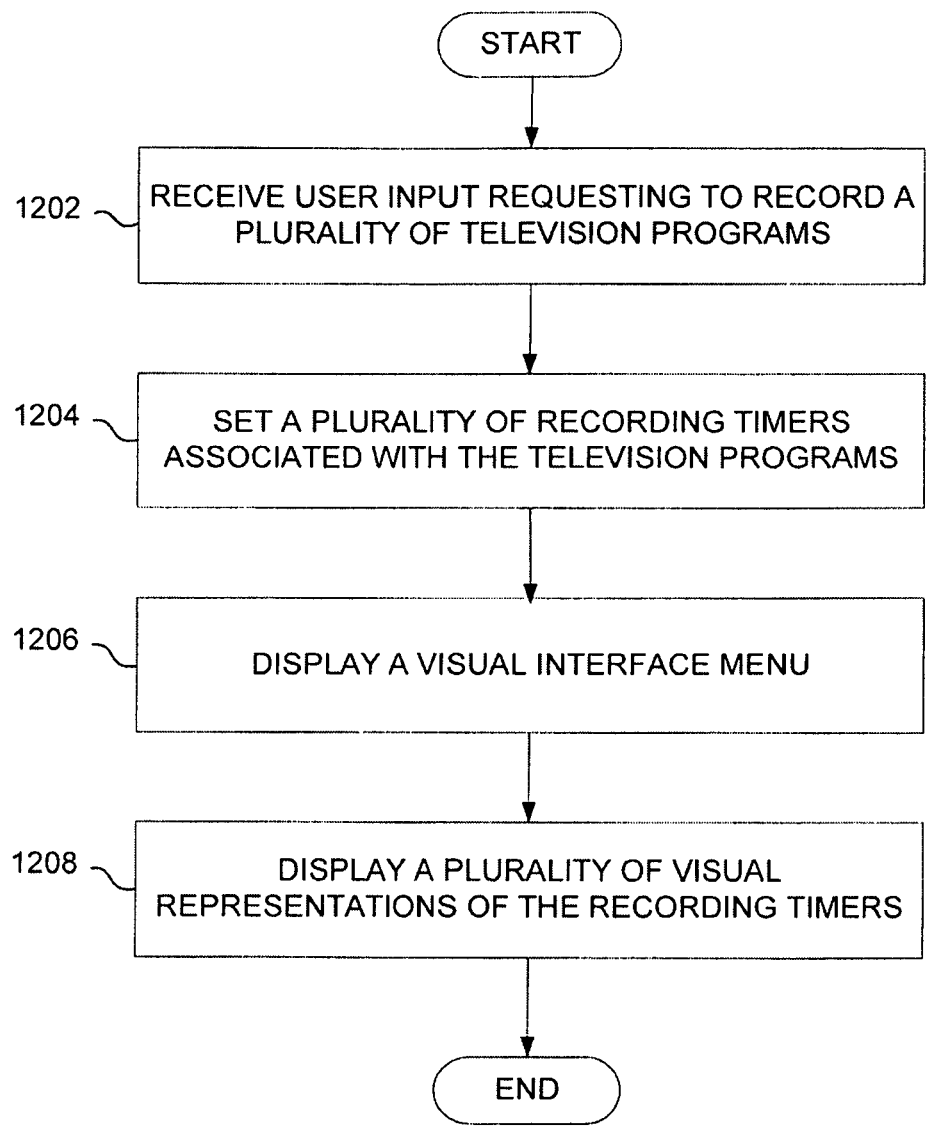
FIG. 12 illustrates a process for visually displaying television recording timers.

FIG. 12 illustrates a process for visually displaying television recording timers. More particularly, FIG. 12 illustrates a process for presenting recording timers associated with a plurality of television receiving resources. The process of FIG. 12 may include other operations not illustrated for the sake of brevity.

The process includes receiving user input requesting to record a plurality of television programs (operation 1202). In at least one embodiment, user input may be provided separately to request recording of each separate television program. Further, in at least one embodiment, the user input indicates which television receiving resource to utilize for recording each distinct television program. The user input may also indicate a recording priority for each of the plurality of recording timers.

The process further includes setting a plurality of recording timers associated with the plurality of television programs (operation 1204). A first portion of the recording timers are associated with a first television receiving resource and a second portion of the recording timers are associated with a second television receiving resource.

The process further includes displaying a visual interface menu (operation 1206). The visual interface menu includes a time axis presenting various time slots along a first axis, e.g., a vertical axis. The visual interface menu also includes a resource axis that separately presents the recording timers associated with each of the first and second television receiving resources.

The process further includes displaying a plurality of visual representations of the recording timers (operation 1208). A first portion of the recording timers are presented along a first portion of the resource axis associated with the first television receiving resource. Similarly, a second portion of the recording timers are presented along a second portion of the resource axis associated with the second television receiving resource. Each of the visual representations is positioned along a portion of the time axis associated with a beginning time and an ending time of an associated recording timer.

In the case of recording conflicts, the process may optionally include displaying information indicating the recording conflict. For example, a recording conflict may be identified during a conflict time period between first and second recording timers associated with a first television receiving resource. A first visual representation of a first recording timer may be displayed overlaid on a portion of the second visual representation along the time axis corresponding to the conflict time period. A visual indicator may also be presented on the second visual representation indicating that the second television program will not be recorded. The process may then optionally include receiving user input for resolving recording conflicts in accordance with the embodiments described above.

Although specific embodiments were described herein, the scope of the invention is not limited to those specific embodiments. The scope of the invention is defined by the following claims and any equivalents therein.

We claim:

1. A method for visually displaying a television recording conflict, the method comprising:
   receiving a first user input requesting to record a first television program;
   receiving a second user input requesting to record a second television program;
   identifying a recording conflict between the first television program and the second television program during a conflict time period in which time boundaries of the first television program and the second television program conflict;
   displaying a first visual representation of the first television program and a second visual representation of the second television program simultaneously along a time axis of a user interface menu, with at least a portion of the first visual representation being overlaid on a portion of the second visual representation along the time axis corresponding to the conflict time period, wherein the overlay of the first visual representation on the portion of the second visual representation causes the portion of the second visual representation to be obscured;
   receiving a user input to graphically modify a time boundary between the first television program and the second television program and thereby resolve the conflict between the first and second television programs by dragging an edge of one or both of the first and second visual representations; and
   responsive to the user input graphically modifying the time boundary, displaying the first visual representation adjacent to the second visual representation along the time axis of the user interface menu such that the first visual representation no longer obscures any portion of the second visual representation.

2. The method of claim 1, wherein displaying the first and second visual representations further comprises:
   modifying the user interface menu so that the portion of the first visual representation is no longer overlaid with the second visual representation after the conflict time period is resolved.

3. The method of claim 1, wherein displaying the first and second visual representations further comprises:
   displaying the second visual representation offset from the first visual representation along an axis of the user interface menu disparate from the time axis.

4. The method of claim 1, further comprising:
   receiving a third user input requesting to resolve the recording conflict; and
   updating at least one recording timer, associated with the recording conflict, based on the third user input.

5. The method of claim 4, wherein receiving the third user input and updating the recording timer further comprise:
   receiving the third user input requesting to modify a time boundary of a recording timer associated with the first television program by dragging an edge of the first visual representation; and
   updating the recording timer associated with the first television program based on the modified time boundary.

6. The method of claim 4, wherein receiving the third user input and updating the recording timer further comprise:
   receiving the third user input requesting to swap positions of the first and second visual representations;
   displaying the portion of the second visual representation overlaid over the portion of the first visual representation; and
   modifying a recording priority of the second recording timer based on the third user input.

7. The method of claim 1, wherein displaying the first visual representation further comprises:
   displaying a first image corresponding with the first television program.

8. A method executable by a television receiver for visually displaying television recording timers, the method comprising:
   the television receiver setting a plurality of recording timers associated with a plurality of television programs, wherein a first portion of the recording timers are associated with a first television receiving resource and a second portion of the recording timers are associated with a second television receiving resource;
   the television receiver presenting a visual interface menu having a time axis and a resource axis for display, the resource axis separately presenting the recording timers associated with each of the first and second television receiving resources;

the television receiver presenting a plurality of visual representations of the recording timers for display, the first portion of the recording timers presented along a first portion of the resource axis and the second portion of the recording timers presented along a second portion of the resource axis, with each of the visual representations positioned along a portion of the time axis associated with a beginning time and an ending time of an associated recording timer; and the television receiver receiving a user input to modify at least one of the beginning time and the ending time of a recording timer by dragging an edge of the visual representation associated with the recording timer, wherein displaying the visual representations further comprises;
identifying a recording conflict, during a conflict time period, between a first and a second of the recording timers that are associated with the first displaying a first visual representation of the first recording timer associated with a first television program; and
displaying a second visual representation of a second recording timer associated with a corresponding to the conflict time period, being overlaid on a portion of the second visual representation along the time axis, wherein the overlay of the first visual representation along the portion of the second visual representation causes the portion of the second visual representation to be obscured.

9. The method of claim 8, wherein displaying the first and second visual representations further comprises:
responsive to the user input modifying at least one of the beginning time and the ending time, displaying the first visual representation adjacent to the second visual representation along the time axis.

10. The method of claim 8 wherein the user input resolves the conflict between the first and second television programs.

11. The method of claim 10, wherein receiving the user input and resolving the recording conflict further comprise:
receiving the user input requesting to record the second television program on the second television receiving source; and
displaying the second visual representation along a second portion of the resource axis.

12. The method of claim 11, further comprising:
identifying a second recording conflict, during a second conflict time period, between the second recording timer and a third of the recording timers that is associated with the second television receiving resource;
displaying a third visual representation of the third recording timer associated with a third television program, with a portion of the third visual representation, corresponding to the second conflict time period, being overlaid on a second portion of the second visual representation along the time axis;
receiving second user input requesting to record the third television program using the first television receiving source;
recording the second television program using the second television receiving source; and
recording the third television program using the first television receiving source.

13. A digital video recorder comprising:
a television tuner that receives and tunes video signals from a programming source;
a storage medium communicatively coupled to the television tuner that stores at least a portion of the video signals received by the television tuner;
an interface module that receives a first user input requesting to record a first television program and that receives a second user input requesting to record a second television program;
a processor communicatively coupled to the television tuner, the storage medium and the interface module that is configured to:
identify a recording conflict between the first television program and the second television program during a conflict time period in which time boundaries of the first television program and the second television program conflict;
output, for display by a display device, a first visual representation of the first television program and a second visual representation of the second television program simultaneously along a time axis of a user interface menu, with at least a portion of the first visual representation being overlaid on a portion of the second visual representation along the time axis corresponding to the conflict time period, wherein the overlay of the first visual representation on the portion of the second visual representation causes the portion of the second visual representation to be obscured;
receive a user input to modify a time boundary between the first television program and the second television program and thereby resolve the conflict between the first and second television programs by dragging an edge of one or both of the first and second visual representations;
responsive to the user input modifying the time boundary, display the first visual representation adjacent to the second visual representation along the time axis of the use interface menu such that the first visual representation no longer obscures any portion of the second visual representation; and
coordinate storage of at least one of the first television program and the second television program onto the storage medium.

14. The digital video recorder of claim 13, wherein the processor outputs a visual indicator on the second visual representation that indicates the second television program will not be recorded.

15. The digital video recorder of claim 13, wherein the processor outputs the second visual representation offset from the first visual representation along an axis of the user interface disparate from the time axis.

16. The digital video recorder of claim 13, wherein the interface module receives a third user input requesting to resolve the recording conflict, and the processor updates a recording timer associated with the first television program based on the third user input.

17. The digital video recorder of claim 16, wherein the interface module receives the third user input requesting to modify a time boundary of a recording time associated with the first television program, and the processor updates the recording timer associated with the first television program based on the modified time boundary.

18. The digital video recorder of claim 17, wherein the interface module receives the third user input requesting to swap positions of the first and second visual representations, and the processor outputs the portion of the second visual representation overlaid over the portion of the first visual representation and modifies a recording priority of the second recording timer based on the third user input.

19. The digital video recorder of claim 13, wherein the processor displays a first image corresponding with the first television program in the first visual representation.

20. A digital video recorder comprising:
- a first television tuner;
- a second television tuner;
- a storage medium;
- an interface module that receives a plurality of first user input requesting to record a plurality of television programs; and
- a processor communicatively coupled to the first television tuner, the second television tuner, the storage medium and the interface module that is configured to:
  - set a plurality of recording timers associated with the plurality of television programs based on the plurality of first user input, wherein a first portion of the recording timers are associated with the first television tuner and a second portion of the recording timers are associated with the second television tuner;
  - output a visual interface menu, for display by a display device, the visual interface menu having a time axis and a resource axis, the resource axis separately presenting the recording timers associated with each of the first and second television tuners in a first row and a second row, respectively;
  - output a plurality of visual representations of the recording timers, the first portion of the recording timers presented along a first portion of the resource axis and the second portion of the recording timers presented along a second portion of the resource axis, with each of the visual representations positioned along a portion of the time axis associated with a beginning time and an ending time of an associated recording timer;
  - receive a second user input graphically dragging one or more of the visual representations associated with the recording timers between the first and second rows of the resource axis, and to thereby resolve a recording conflict in recording two of the television programs; and
  - coordinate the storage of at least a portion of the plurality of television programs onto the storage medium,
- wherein the processor is further configured to:
  - identify the recording conflict, during a conflict time period, between a first and a second of the recording timers that are associated with the first television receiving resource;
  - output a first visual representation of the first recording timer associated with a first television program; and
  - output a second visual representation of a second recording timer associated with a second television program, with a portion of the first visual representation, corresponding to the conflict time period, being overlaid on a portion of the second visual representation along the time axis, wherein the overlay of the first visual representation on the portion of the second visual representation causes the portion of the second visual representation to be obscured.

21. The digital video recorder of claim 20, wherein the processor outputs a visual indicator on the second visual representation that indicates the second television program will not be recorded.

22. The digital video recorder of claim 21, wherein the interface module receives the second user input requesting to resolve the recording conflict, and the processor resolves the recording conflict based on the second user input.

23. The digital video recorder of claim 22, wherein the interface module receives the second user input requesting to modify a time boundary of a recording timer associated with the first television program and the processor updates the recording timer associated with the first television program based on the modified time boundary.

24. The digital video recorder of claim 22, wherein the interface module receives the second user input requesting to swap positions of the first and second visual representations, and the processor displays the portion of the second visual representation overlaid over the portion of the first visual representation and changes a recording priority of the second recording timer based on the second user input.

25. The digital video recorder of claim 22, wherein the interface module receives the second user input requesting to record the second television program on the second television receiving source and the processor outputs the second visual representation along a second portion of the resource axis and coordinates recording of the second television program using the second television receiving resource.

26. The digital video recorder of claim 25, wherein the processor is further configured to:
- identify a second recording conflict, during a second conflict time period, between the second. recording timer and a third of the recording timers that is associated with the second television receiving resource;
- output a third visual representation of the third recording timer associated with a third television program, with a portion of the third visual representation, corresponding to the second conflict time period, being overlaid on a second portion of the second visual representation along the time axis;
- receive third user input requesting to record the third television program on the first television receiving source;
- record the second television program using the second television receiving source; and
- record the third television program using the first television receiving source.

* * * * *